No. 780,959. PATENTED JAN. 24, 1905.
F. C. PALMER.
WALL HOOK.
APPLICATION FILED AUG. 25, 1904.
Fig. 1.
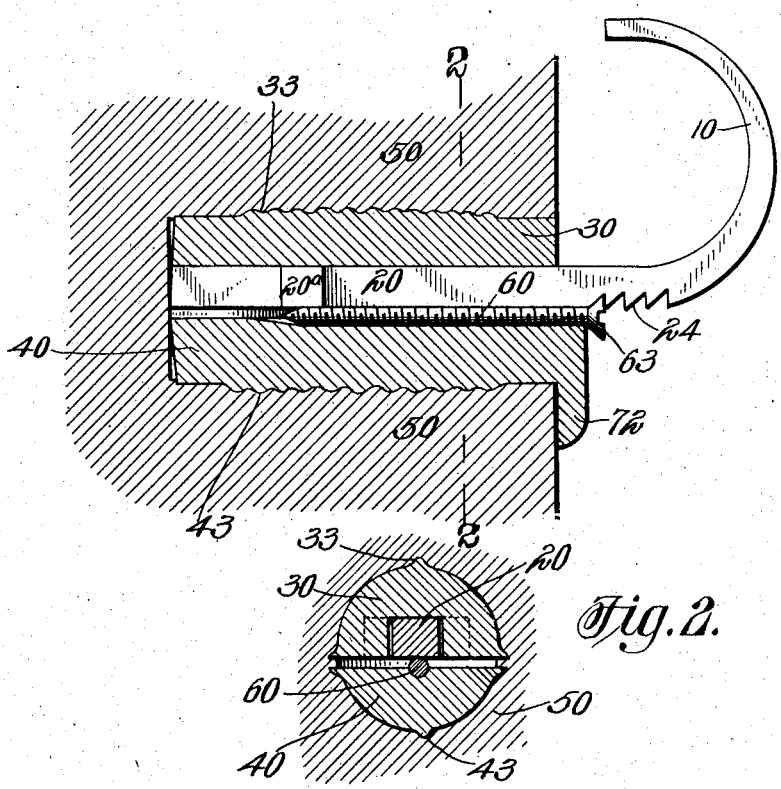
Fig. 2.
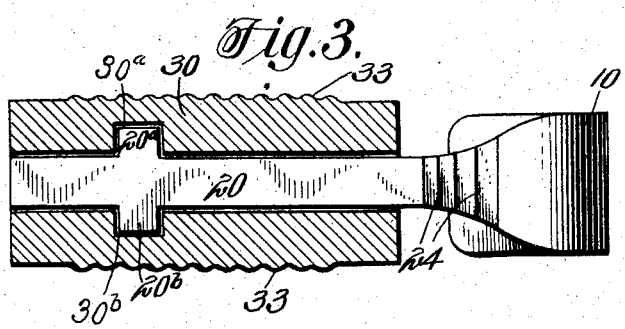
Fig. 3.
Witnesses
Alan McDonnell
S. S. Newton
Inventor
Frederick C. Palmer
By William R. Baird
Attorney No. 780,959.

Patented January 24, 1905.

UNITED STATES PATENT OFFICE.

FREDERICK C. PALMER, OF BROOKLYN, NEW YORK.

WALL-HOOK.

SPECIFICATION forming part of Letters Patent No. 780,959, dated January 24, 1905.

Original application filed January 26, 1904, Serial No. 190,750. Divided and this application filed August 25, 1904. Serial No. 222,070.

*To all whom it may concern:*

Be it known that I, FREDERICK C. PALMER, a citizen of the United States, and a resident of Brooklyn, in the county of Kings and State of New York, have invented certain new and useful Improvements in Wall-Hooks, of which the following is a specification.

This application is a division of an application filed by me January 26, 1904, Serial No. 190,750, and allowed July 26, 1904.

My invention relates to wall-hooks; and its novelty consists in the construction and adaptation of the parts comprising the means for securing the hook in place.

The object of my invention is to provide a wall-hook which is adapted for divers purposes and at the same time may be held securely in place without danger of displacement under usual conditions.

In the drawings, Figure 1 is a vertical section of a wall and an inserted wall-hook provided with my novel fastening means. Fig. 2 is a vertical transverse section on the line 2 2 of Fig. 1, and Fig. 3 is a plan view of the under side of the wall-hook and upper plug or recessed bar.

In the drawings, 10 is the hook, provided with a shank 20, which is made substantially rectangular in cross-section and is adapted to be partially surrounded by and seated within a recess in a semicylindrical upper plug or bar 30. A lower plug 40 is also made semicylindrical in cross-section, so that the two together will substantially fill a cylindrical aperture in a wall 50. The bar 30 is provided externally with projections 33, and the plug 40 is provided in the same manner with projections 43. The plug 40 is also provided with a downwardly-extending flange 72 to rest against the surface of the wall 50 when in place. The shank 20 of the hook is indented or transversely toothed at 24, and the plug 40 is provided with a longitudinal tapering groove 44 in its upper surface, and when the parts are in place in an aperture in the wall 50, as shown in Fig. 1, a nail, screw, or like device 60 is driven or otherwise entered in said groove 44 between the shank and plug. The groove 44 being at all points of less transverse area than the nail or screw 60, the plug below and bar and shank above will be forced apart by the entry of the nail, thus causing the projections 33 and 43 to firmly engage the walls of the aperture in the wall and the whole device to be securely held therein. The nail or screw 60 is provided with conical or otherwise laterally-projecting head 63, which when the nail is fully entered, as shown in Fig. 1, engages the transverse indentations or teeth 24 of the shank, thus preventing the withdrawal or accidental displacement of the nail or screw while the shank remains in place. The shank 20 is of course closely clamped between the bar 30 and nail or screw 60 by the wedge action of the latter; but further provision against its withdrawal is provided, comprising lateral projections $20^a$ and $20^b$, which engage in corresponding recesses $30^a$ and $30^b$, which are, in effect, lateral extensions of the longitudinal recess of the bar 30. The shank being thus made cruciform and adapted to a cruciform recess in the bar, it cannot possibly be withdrawn from the aperture in the wall while the bar is held in place therein by the nail or screw 60 and plug 40. All of the parts thus coact to securely hold the whole structure in the aperture, the extension-flange preventing any tendency to withdrawal by vertical rocking or strain due to extra weight or strain placed upon the hook.

What I claim as new is—

1. Securing means for wall-hooks or like devices comprising a shank, a recessed bar adapted to embrace said shank, a plug adapted to partially fill an aperture in which the bar and shank are placed, and means engaging the shank and plug for pressing them apart and wedging the bar and plug in the aperture.

2. Securing means for wall-hooks or like devices comprising a shank, a recessed bar adapted to embrace said shank, a plug adapted to partially fill an aperture in which the bar and shank are placed, means engaging the shank and plug for pressing them apart and wedging the bar and plug in the aperture, and means for locking said engaging means against withdrawal.

3. Securing means for wall-hooks or like devices comprising a shank, having indentations in its surface, a recessed bar adapted to embrace said shank, a plug adapted to partially fill an aperture in which the bar and shank are placed, and a nail or like device engaging the shank and plug for pressing them apart and wedging the bar and plug in the aperture, said nail having a laterally-projecting head to engage the indentations of the shank.

4. Securing means for wall-hooks or like devices comprising a shank, having a lateral projection, a bar having a recess with lateral extension to embrace said shank and projection, a plug adapted to partially fill an aperture in which the securing means are placed, and means for forcing the plug and bar into contact with the walls of said aperture.

5. Securing means for wall-hooks or like devices comprising a shank, having a lateral projection, a bar having a recess with lateral extension to embrace said shank and projection, a plug adapted to partially fill an aperture in which the securing means are placed, means for forcing the plug and bar into contact with the walls of said aperture, and means for locking such forcing means against withdrawal.

6. Securing means for wall-hooks or like devices comprising a shank, having a lateral projection, a bar having a recess with lateral extension to embrace said shank and projection, a plug adapted to partially fill an aperture in which the securing means are placed, and a nail or like device adapted to be driven between the shank and plug to force the bar and plug into contact with the walls of the aperture.

7. Securing means for wall-hooks or like devices comprising a shank, having a lateral projection, a bar having a recess with lateral extension to embrace said shank and projection, a plug adapted to partially fill an aperture in which the securing means are placed, and a nail or like device adapted to be driven between the shank and plug to force the bar and plug into contact with the walls of the aperture, the shank having indentations and the nail being provided with a head for engaging therewith to prevent the withdrawal of the nail.

8. Securing means for wall-hooks or like devices comprising a shank of cruciform shape, a bar having a cruciform recess to receive said shank, a plug, and means for forcing the plug and bar into contact with the walls of an aperture in which the wall-hook is to be secured.

9. Securing means for wall-hooks or like devices comprising a shank of cruciform shape, a bar having a cruciform recess to receive said shank, a plug, means for forcing the plug and bar into contact with the walls of an aperture in which the wall-hook is to be secured, and means for locking said forcing means against withdrawal.

10. Securing means for wall-hooks or like devices comprising a shank of cruciform shape, a bar having a cruciform recess to receive said shank, a plug, and a nail or like device for forcing the plug and bar into contact with the walls of an aperture in which the wall-hook is to be secured.

11. Securing means for wall-hooks or like devices comprising a shank of cruciform shape, a bar having a cruciform recess to receive said shank, a plug, and a nail or like device for forcing the plug and bar into contact with the walls of an aperture in which the wall-hook is to be secured, the shank being provided with indentations and the nail with a head for engaging therewith to prevent the withdrawal of the nail.

Witness my hand, this 23d day of August, 1904, at the city of New York, in the county and State of New York.

FREDERICK C. PALMER.

Witnesses:
ALAN McDONNELL,
S. S. NEWTON.